United States Patent
Hu

(10) Patent No.: US 10,505,764 B2
(45) Date of Patent: Dec. 10, 2019

(54) SIGNAL SENDING METHOD AND APPARATUS

(71) Applicant: Huawei Technologies Co., Ltd., Shenzhen (CN)

(72) Inventor: Yupeng Hu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/121,331

(22) Filed: Sep. 4, 2018

(65) Prior Publication Data
US 2018/0367344 A1 Dec. 20, 2018

Related U.S. Application Data

(63) Continuation of application No. PCT/CN2016/107541, filed on Nov. 28, 2016.

(30) Foreign Application Priority Data

Mar. 3, 2016 (CN) .......................... 2016 1 0122094

(51) Int. Cl.
*H04L 25/02* (2006.01)
*H04B 3/54* (2006.01)
(Continued)

(52) U.S. Cl.
CPC ......... *H04L 25/0204* (2013.01); *H04B 3/542* (2013.01); *H04L 5/005* (2013.01); *H04L 27/2626* (2013.01)

(58) Field of Classification Search
CPC . H04L 27/2613; H04L 5/0044; H04L 5/0048; H04L 25/0204; H04L 5/05;
(Continued)

(56) References Cited

U.S. PATENT DOCUMENTS 7,453,794 B2 11/2008 Fang et al.
2005/0243791 A1* 11/2005 Park .................... H04L 25/0232
370/343
(Continued)

FOREIGN PATENT DOCUMENTS

CN 1527513 A 9/2004
CN 1791077 A 6/2006
(Continued)

OTHER PUBLICATIONS

Foreign Communication From a Counterpart Application, European Application No. 16892368.8, Extended European Search Report dated Jan. 17, 2019, 8 pages.
(Continued)

*Primary Examiner* — Sung S Ahn
(74) *Attorney, Agent, or Firm* — Conley Rose, P.C.

(57) ABSTRACT

A signal sending method and apparatus to improve channel estimation accuracy of a receive end to improve data decoding accuracy of the receive end, where the method is applied to a system whose physical layer frame structure includes a preamble and a payload (PL) field. The method includes inserting one or more pilot time domain symbols between orthogonal frequency division multiplexing (OFDM) time domain symbols in the PL field to obtain a physical layer frame, and sending the physical layer frame to a receive end, where the preamble and the pilot time domain symbol are used together by the receive end to perform channel estimation.

12 Claims, 5 Drawing Sheets

A transmit end inserts one or more pilot time domain symbols between OFDM time domain symbols in a PL field to obtain a physical layer frame — S101

The transmit end sends the physical layer frame to a receive end, where a preamble and the pilot time domain symbols are used together by the receive end to perform channel estimation — S102

(51) Int. Cl.
*H04L 5/00* (2006.01)
*H04L 27/26* (2006.01)
(58) Field of Classification Search
CPC ............... H04L 5/0053; H04L 25/0202; H04L 27/2626; H04B 3/542
See application file for complete search history.

(56) References Cited

U.S. PATENT DOCUMENTS

| | | | | |
|---|---|---|---|---|
| 2005/0286405 | A1* | 12/2005 | Sun | ............... H04B 7/1858 370/208 |
| 2006/0114812 | A1* | 6/2006 | Kim | ............... H04L 5/0023 370/206 |
| 2009/0274174 | A1 | 11/2009 | Hwang et al. | |
| 2014/0115429 | A1* | 4/2014 | Eroz | ............... H04L 1/00 714/790 |
| 2016/0050097 | A1 | 2/2016 | Atungsiri | |

FOREIGN PATENT DOCUMENTS

| | | |
|---|---|---|
| CN | 1905546 A | 1/2007 |
| CN | 1909528 A | 2/2007 |
| CN | 1988520 A | 6/2007 |
| CN | 103856422 A | 6/2014 |
| CN | 103873397 A | 6/2014 |
| CN | 105743629 A | 7/2016 |
| WO | 2005043791 A2 | 5/2005 |

OTHER PUBLICATIONS

Machine Translation and Abstract of Chinese Publication No. CN1527513, Sep. 8, 2004, 19 pages.
Machine Translation and Abstract of Chinese Publication No. CN1791077, Jun. 21, 2006, 8 pages.
Machine Translation and Abstract of Chinese Publication No. CN1905546, Jan. 31, 2007, 18 pages.
Machine Translation and Abstract of Chinese Publication No. CN1909528, Feb. 7, 2007, 13 pages.
Machine Translation and Abstract of Chinese Publication No. CN1988520, Jun. 27, 2007, 12 pages.
Machine Translation and Abstract of Chinese Publication No. CN103856422, Jun. 11, 2014, 16 pages.
Machine Translation and Abstract of Chinese Publication No. CN103873397, Jun. 18, 2014, 15 pages.
Machine Translation and Abstract of Chinese Publication No. CN105743629, Jul. 6, 2016, 16 pages.
Ohno, S., et al, "Preamble and pilot symbol design for channel estimation in OFDM systems with null subcarriers," EURASIP Journal on Wireless Communications and Networking, Jan. 2, 2011, 17 pages.
"Part 11: Wireless LAN Medium Access Control (MAC) and Physical Layer (PHY) specifications, High-Speed Physical Layer in the 5 GHz Band," IEEE Std 802.11a-1999, Jun. 12, 2003, 91 pages.
Foreign Communication From a Counterpart Application, Chinese Application No. 201610122094.9, Chinese Office Action dated Apr. 28, 2018, 6 pages.
Foreign Communication From a Counterpart Application, PCT Application No. PCT/CN2016/107541, English Translation of International Search Report dated Feb. 9, 2017, 3 pages.
Foreign Communication From a Counterpart Application, PCT Application No. PCT/CN2016/107541, English Translation of Written Opinion dated Feb. 9, 2017, 4 pages.

* cited by examiner

SIGNAL SENDING METHOD AND APPARATUS

CROSS-REFERENCE TO RELATED APPLICATIONS

This application is a continuation of International Patent Application No. PCT/CN2016/107541 filed on Nov. 28, 2016, which claims priority to Chinese Patent Application No. 201610122094.9 filed on Mar. 3, 2016. The disclosures of the aforementioned applications are hereby incorporated by reference in their entireties.

TECHNICAL FIELD

The present disclosure relates to the field of data processing technologies, and in particular, to a signal sending method and apparatus.

BACKGROUND

In power line communication, a receive end generally performs frame synchronization, channel estimation, and the like using a preamble in a system whose physical layer frame structure includes the preamble. The preamble includes several orthogonal frequency division multiplexing (OFDM) symbols.

To transmit a large amount of information, a relatively long frame length is set for a physical layer frame in the power line communication. Because a power line communication channel is time varying, when the frame length is relatively long (for example, greater than 10 milliseconds (ms)), the receive end cannot reflect the time-varying characteristic of the channel based on only a result obtained after channel estimation is performed using the preamble. Consequently, channel estimation accuracy of the receive end is relatively low, resulting in relatively low data decoding accuracy of the receive end.

SUMMARY

Embodiments of the present disclosure provide a signal sending method and apparatus to improve channel estimation accuracy of a receive end in order to improve data decoding accuracy of the receive end.

The following technical solutions are used in the embodiments of the present disclosure to achieve the foregoing objective.

According to a first aspect, a signal sending method is provided, and is applied to a system whose physical layer frame structure includes a preamble and a payload (PL) field. The method includes inserting one or more pilot time domain symbols between OFDM time domain symbols in the PL field to obtain a physical layer frame, and sending the physical layer frame to a receive end, where the preamble and the pilot time domain symbol are used together by the receive end to perform channel estimation.

According to a second aspect, a signal sending apparatus is provided, and is applied to a system whose physical layer frame structure includes a preamble and a PL field. The apparatus includes an insertion unit and a sending unit. The insertion unit is configured to insert one or more pilot time domain symbols between OFDM time domain symbols in the PL field to obtain a physical layer frame. The sending unit is configured to send the physical layer frame to a receive end, where the preamble and the pilot time domain symbol are used together by the receive end to perform channel estimation.

For example, the pilot time domain symbol may be a synchronization symbol (SYNCP) in the preamble, or any other known symbol agreed on by a transmit end and the receive end. Optionally, a guard interval length of the SYNCP is equal to a guard interval length of an OFDM time domain symbol. In this way, the transmit end may reuse some resources, for example, a table of known frequency domain signals used by the transmit end to store the SYNCP can be reused such that some resources are saved.

In the first aspect or the second aspect, the transmit end may insert one or more pilot time domain symbols between any two adjacent OFDM time domain symbols, and insert one or more pilot time domain symbols between two adjacent OFDM time domain symbols that are in each of a plurality of groups of OFDM time domain symbols.

In the first aspect or the second aspect, the transmit end inserts a pilot time domain symbol between OFDM time domain symbols in the PL field in the physical layer frame. The pilot time domain symbol and the preamble in the physical layer frame are used together by the receive end to perform channel estimation. In this way, performing channel estimation using only the preamble, when a frame length of the physical layer frame is relatively long, a channel change can be better traced, to improve channel estimation accuracy in order to improve data decoding accuracy of the receive end.

In the first aspect, optionally, inserting one or more pilot time domain symbols between OFDM time domain symbols in the PL field to obtain a physical layer frame may include inserting n pilot time domain symbols at intervals of m OFDM time domain symbols in the PL field to obtain the physical layer frame, where $m \geq 1$, $n \geq 1$, and both m and n are integers.

Correspondingly, in the second aspect, optionally, the insertion unit may be further configured to insert n pilot time domain symbols at intervals of m OFDM time domain symbols in the PL field to obtain the physical layer frame, where $m \geq 1$, $n \geq 1$, and both m and n are integers.

Based on the optional implementation, in the first aspect or the second aspect, optionally, the physical layer frame structure further includes a frame control (FC) field, and the FC field carries at least one of the following information of whether the pilot time domain symbol is inserted in the physical layer frame, a value of m, a value of n, and the like.

With reference to any one of the first aspect or the foregoing optional implementations of the first aspect, before one or more pilot time domain symbols are inserted at intervals of a preset quantity of OFDM time domain symbols in the PL field to obtain the physical layer frame, the method may further include determining, based on a time-varying characteristic of a power line channel, at least one of the following information of whether the pilot time domain symbol is inserted in the physical layer frame, the value of m, the value of n, and the like. Correspondingly, the apparatus provided in the second aspect may further include a determining unit configured to determine, based on a time-varying characteristic of a power line channel, at least one of the following information of whether the pilot time domain symbol is inserted in the physical layer frame, the value of m, the value of n, and the like. In this way, a channel change can be better traced, to improve channel estimation accuracy in order to improve data decoding accuracy of the receive end.

According to a third aspect, an embodiment of the present disclosure provides a signal generation apparatus. The apparatus has a function of implementing the method provided in the first aspect. The function may be implemented using hardware, or may be implemented by running corresponding software by hardware. The hardware or the software includes one or more modules corresponding to the foregoing functions. In a possible implementation, a structure of the apparatus includes a processor and a transceiver. The processor is configured to support the apparatus in performing a corresponding function in the method in the first aspect. The transceiver is configured to support communication between the apparatus and another device. The apparatus may further include a memory. The memory is coupled to the processor, and stores necessary program instructions and data of the apparatus. The apparatus may be a transmit end.

According to a fourth aspect, an embodiment of the present disclosure provides a storage medium. The storage medium is configured to store a computer software instruction used in the method in the first aspect, and includes corresponding programs used to perform all actions in the first aspect.

DESCRIPTION OF EMBODIMENTS

Technical solutions in embodiments of the present disclosure are applied to a system whose physical layer frame structure includes a preamble. The physical layer frame structure may include but is not limited to a physical layer frame structure specified in a broadband P1901 standard, a physical layer frame structure specified in a narrowband G3 standard, a physical layer frame structure specified in a narrowband PRIME standard, and the like.

Figure 1:
FIG. 1 is a schematic diagram of a physical layer frame structure according to an embodiment of the present disclosure.

The physical layer frame structure specified in the broadband P1901 standard and the physical layer frame structure specified in the narrowband G3 standard are shown in FIG. 1. The frame structure shown in FIG. 1 includes three parts a preamble, an FC field, a PL field. The FC field includes OFDM symbols that carry control information in a fixed format. After decoding the FC field, a receive end may obtain control information (for example, a modulation scheme and an encoding scheme) of the PL field. The receive end may decode the PL field based on the control information of the PL field in order to obtain data through parsing. The PL field includes several OFDM symbols. Data carried in the OFDM symbols is data that needs to be transmitted by the transmit end to the receive end, namely, to-be-transmitted data.

A difference between the physical layer frame structure specified in the broadband P1901 standard and the physical layer frame structure specified in the narrowband G3 standard lies in that the bandwidth occupied by a preamble in the broadband P1901 standard is different from that occupied by a preamble in the narrowband G3 standard, a quantity of SYNCPs included in the preamble in the broadband P1901 standard is different from a quantity of synchronization symbols included in the preamble in the narrowband G3 standard, a quantity of synchronization symbols (SYNCMs) that are opposite numbers of the SYNCPs and that are in the preamble in the broadband P1901 standard is different from a quantity of synchronization symbols that are opposite numbers of the SYNCPs and that are in the preamble in the narrowband G3 standard, a sampling rate in the broadband P1901 standard is different from a sampling rate in the narrowband G3 standard, and the like.

A difference between the physical layer frame structure specified in the narrowband PRIME standard and the frame structure shown in FIG. 1 lies in that the FC field in FIG. 1 is referred to as a header field herein.

The following describes some terms used in this specification in order to enable a reader to have a better understanding.

"Data" and a "pilot" belong to concepts of a same level. The data is valid information (or referred to as available information, to-be-transmitted data, or the like) sent by the transmit end to the receive end. The data is known to the transmit end, but unknown to the receive end. The pilot is information sent by the transmit end to the receive end for channel estimation and synchronization. The pilot is known to the transmit end and the receive end.

An "OFDM time domain symbol" is an OFDM symbol in a time domain dimension. A "pilot time domain symbol" is a pilot symbol in the time domain dimension. A "pilot subcarrier" is a subcarrier in which information carried on the subcarrier is pilots only.

A signal sending method provided in this specification may be performed by the transmit end. Both the transmit end and the receive end in this specification may be a base station, an access point (AP), user equipment (UE), or the like. "A plurality of" in this specification means two or more than two. A "channel" and a "power line channel" in this specification represent a same meaning, and the "channel" or the "power line channel" can be interchanged.

In the technical solutions provided in the embodiments of the present disclosure, a pilot time domain symbol is inserted between OFDM time domain symbols in the PL field to improve channel estimation accuracy of the receive end in order to improve data decoding accuracy of the receive end. In particular, if a frame length is relatively long, because the channel changes in a PL phase, the receive end obtains an inaccurate channel estimation result based on only channel estimation performed using the preamble.

The following describes the technical solutions in the embodiments of the present disclosure using examples with reference to the accompanying drawings in the embodiments of the present disclosure.

Figure 2:
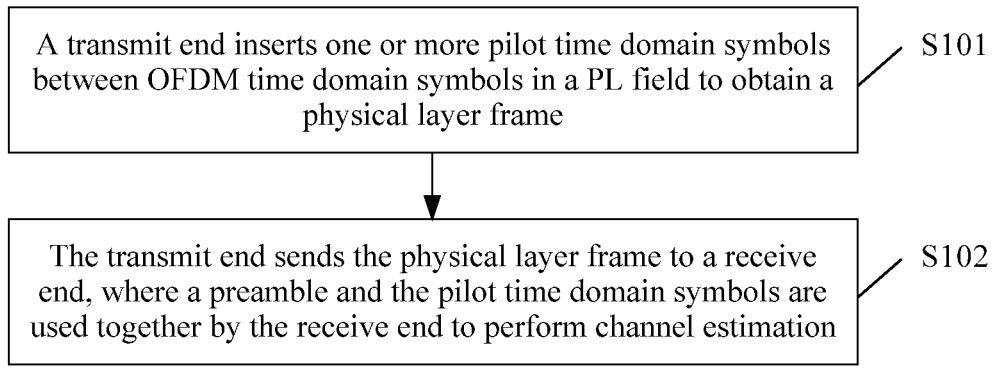
FIG. 2 is a schematic flowchart of a signal sending method according to an embodiment of the present disclosure.

As shown in FIG. 2, FIG. 2 is a schematic flowchart of a signal sending method according to an embodiment of the present disclosure. The method shown in FIG. 2 is applied to a system whose physical layer frame structure includes a preamble and a PL field. For description related to the physical layer frame structure, refer to the foregoing description. The method shown in FIG. 2 includes the following steps S101 and S102.

Step S101. A transmit end inserts one or more pilot time domain symbols between OFDM time domain symbols in a PL field to obtain a physical layer frame.

The PL field may include a plurality of OFDM time domain symbols. A guard interval corresponding to each OFDM time domain symbol may be added before the OFDM time domain symbol. All OFDM time domain symbols in the PL field have same lengths (namely, duration). Different OFDM time domain symbols may be corresponding to the same or different guard interval lengths.

A length of an inserted pilot time domain symbol may be the same as or different from the length of the OFDM time domain symbol. This embodiment of the present disclosure imposes no limitation on a specific implementation of content of the pilot, provided that the content is known to both the transmit end and a receive end. For the pilot time domain symbol, a pilot is mapped to a subcarrier with data. In specific implementation, the transmit end may properly select, based on specifications of different countries and regions, or another specification requiring that data is not transmitted on some subcarriers, a subcarrier to which data is mapped. For example, on a frequency band with subcarriers numbered 0 to 127, subcarriers 0 to 29 and subcarriers 31 to 99 are subcarriers to which data is mapped. In this case, the pilot may be mapped to the subcarriers 0 to 29 and the subcarriers 31 to 99.

Figure 3:
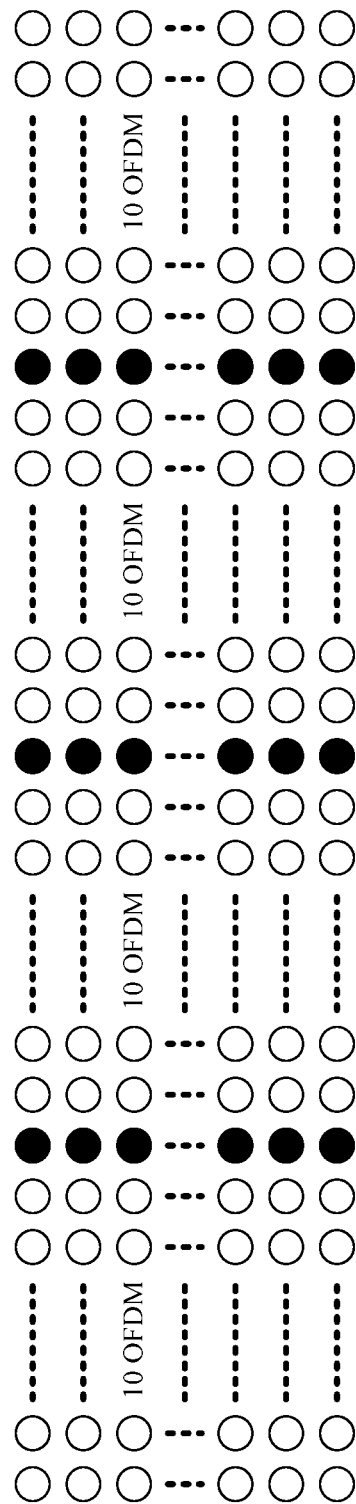
FIG. 3 is a schematic structural diagram of a PL field according to an embodiment of the present disclosure.

As shown in FIG. 3, FIG. 3 is a schematic structural diagram of a PL field in the physical layer frame obtained in step S101. In FIG. 3, each column represents one OFDM symbol, one circle in each column represents one subcarrier, a hollow circle represents a data subcarrier, and a solid circle represents a pilot subcarrier. In FIG. 3, an example in which one pilot symbol is inserted at intervals of 10 OFDM symbols (that is, one pilot time domain symbol is inserted at intervals of 10 OFDM time domain symbols) in time domain is used as an example for description.

Further, for one physical frame, the transmit end may insert one or more pilot time domain symbols between any two adjacent OFDM time domain symbols, for example, insert a pilot time domain symbols between an OFDM time domain symbol 5 and an OFDM time domain symbol 6. In addition, the transmit end may insert one or more pilot time domain symbols between two adjacent OFDM time domain symbols that are in each of a plurality of groups of OFDM time domain symbols. For example, the transmit end inserts a pilot time domain symbols between the OFDM time domain symbol 5 and the OFDM time domain symbol 6, and inserts b pilot time domain symbols between an OFDM time domain symbol 10 and an OFDM time domain symbol 11, where both a and b are integers greater than or equal to 1, and a and b may be equal or unequal. If a pattern that describes a location of a pilot in a physical frame is referred to as a pilot pattern, different physical frames may be corresponding to the same or different pilot patterns.

Step S102. The transmit end sends the physical layer frame to a receive end, where a preamble and the pilot time domain symbols are used together by the receive end to perform channel estimation.

A process of transmitting the physical layer frame by the transmit end to the receive end may be considered that the physical layer frame passes through a generalized channel. The receive end needs to perform channel estimation on the channel, to decode data in the PL field.

In the signal sending method provided in this embodiment of the present disclosure, the transmit end inserts a pilot time domain symbol between OFDM time domain symbols in the PL field in the physical layer frame. The pilot time domain symbol and the preamble in the physical layer frame are used together by the receive end to perform channel estimation. In this way, performing channel estimation using only the preamble, when a frame length of the physical layer frame is relatively long, a channel change can be better traced to improve channel estimation accuracy in order to improve data decoding accuracy of the receive end.

Figure 4:
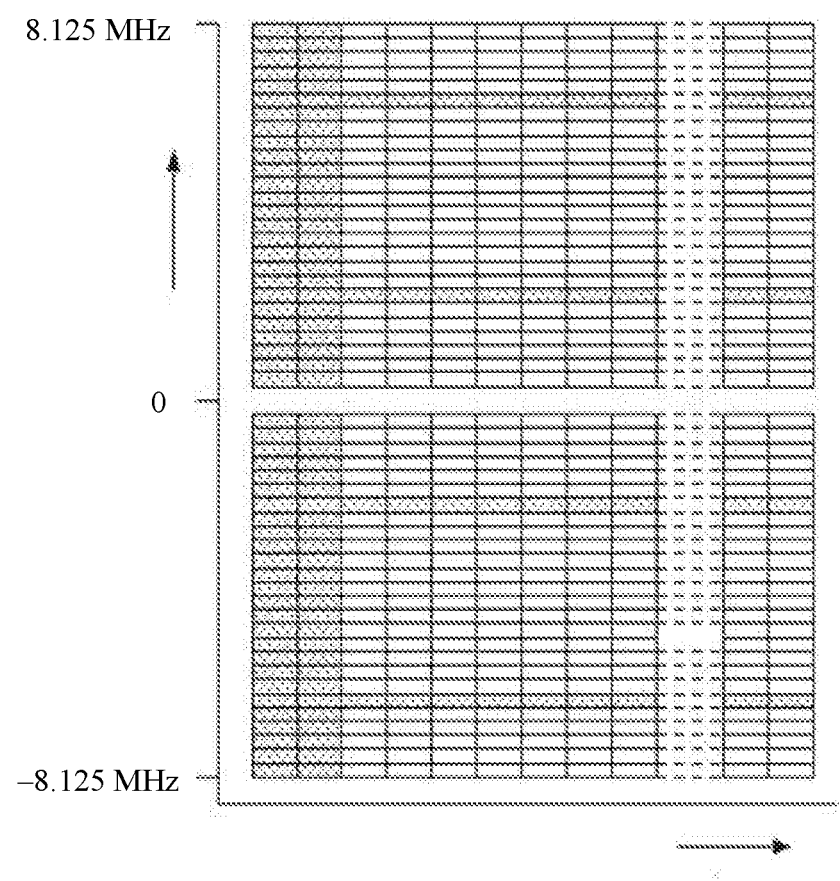
FIG. 4 is a schematic structural diagram of a signal according to an embodiment of the present disclosure.

It should be noted that a signal structure shown in FIG. 4 is disclosed in the wireless network standard 802.11a. In FIG. 4, a lateral axis represents time domain, a longitudinal axis represents frequency domain, each column represents an OFDM symbol, each small box represents a time-frequency resource, each small shadow box represents a time-frequency resource that carries a pilot, and each small blank box represents a time-frequency resource that carries data. A signal shown in FIG. 4 may be understood as follows. A plurality of pilot subcarriers are inserted in frequency domain, and two pilot time domain symbols are inserted before the first OFDM time domain symbol in time domain. In this technical solution, each OFDM time domain symbol carries a pilot, that is, there is a relatively large quantity of inserted pilots.

Figure 5:
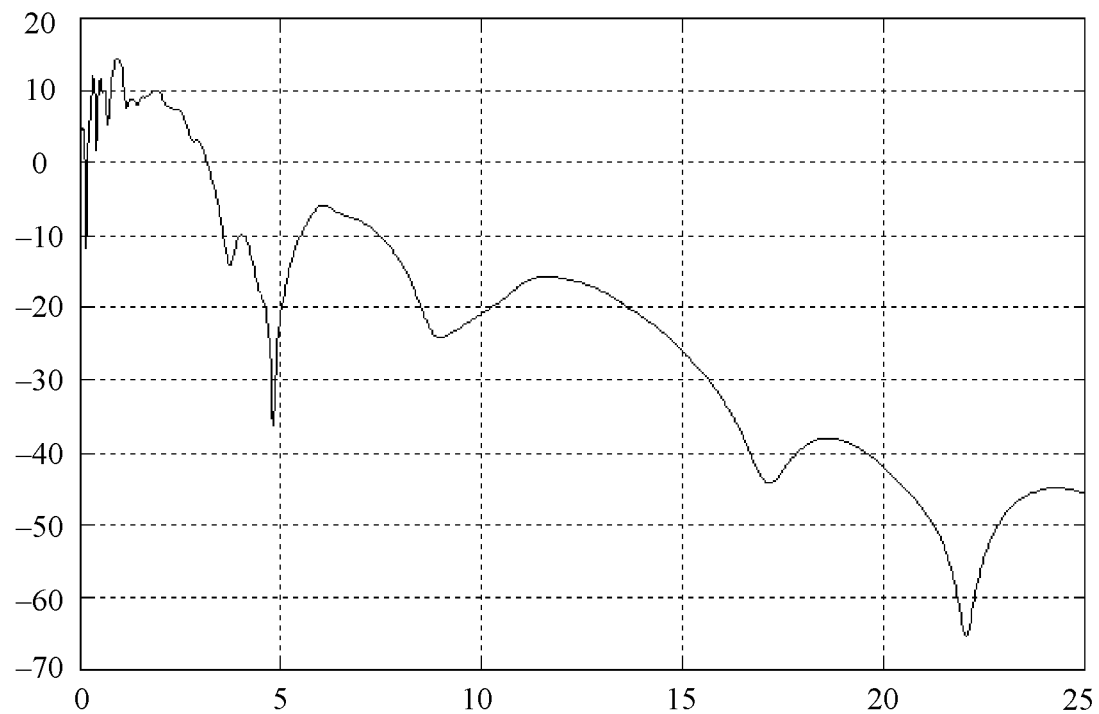
FIG. 5 is a schematic diagram of channel frequency selective fading according to an embodiment of the present disclosure.
Figure 6:
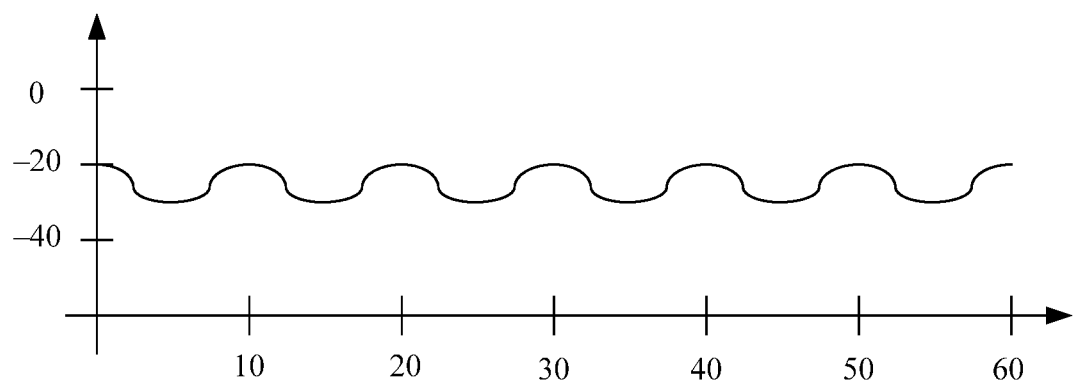
FIG. 6 is a schematic diagram of channel time domain selective fading according to an embodiment of the present disclosure.

However, in actual implementation, a power line channel is a periodic time-varying channel with extremely strong frequency selectivity. In addition, a signal attenuates fast in frequency domain but changes slowly in time domain. As shown in FIG. 5, FIG. 5 is a schematic diagram of channel frequency selective fading. In FIG. 5, a lateral axis represents a frequency (in megahertz (MHz)), and a longitudinal axis represents channel attenuation (in decibel (dB)). As shown in FIG. 6, FIG. 6 is a schematic diagram of channel time domain selective fading. In FIG. 6, a lateral axis represents a time (in ms), and a longitudinal axis represents average channel attenuation (in dB). In FIG. 6, an example in which one period is 10 ms is used for description. 10 ms may include a plurality of OFDM symbols. For example, if both a length of an OFDM time domain symbol and a guard interval length corresponding to the OFDM time domain symbol are 50 microseconds (μs), 10 ms includes 200 OFDM time domain symbols.

It may be learned from FIG. 5 and FIG. 6 that a signal attenuates relatively fast in frequency domain. Therefore, undersampling in frequency domain is caused in a technical solution of adding a pilot subcarrier to frequency domain shown in FIG. 4. In addition, because a signal changes slowly in time domain, some pilot resources are wasted for adding a pilot to each OFDM time domain symbol.

In this embodiment of the present disclosure, several pilot symbols are inserted in time domain, that is, several time domain pilot symbols are inserted. Therefore, this can save some pilot resources in comparison with the technical solution of adding a pilot to each OFDM time domain symbol shown in FIG. 4. In addition, in comparison with the technical solution shown in FIG. 4, channel tracing can be implemented using lower bandwidth in the technical solution provided in this embodiment of the present disclosure such that bandwidth resources can be saved. In addition, in this embodiment of the present disclosure, in frequency domain, one physical frame includes a relatively large quantity of pilots, that is, relatively dense sampling is performed in frequency domain, and in time domain, one physical frame includes a relatively small quantity of pilots, that is, relatively sparse sampling is performed in time domain. In this way, in comparison with the method shown in FIG. 4, this can better adapt to a channel time-varying characteristic. Therefore, sampling can be performed on a channel more effectively such that a channel change can be better traced.

Optionally, step S101 may include a transmit end inserts n pilot time domain symbols at intervals of m OFDM time domain symbols in a PL field to obtain a physical layer frame, where both m and n are integers greater than or equal to 1. Optionally, the method may further include determining, by the transmit end based on channel frequency selectivity, at least one of the following information of whether the pilot time domain symbol is inserted in the physical layer frame, a value of m, and a value of n. For example, one or more pieces of the information may be determined based on FIG. 5 and FIG. 6.

In specific implementation, the transmit end and the receive end first need to communicate with each other to negotiate a specific quantity of pilot time domain symbols that need to be inserted at intervals of a specific quantity of OFDM time domain symbols, and specific OFDM time domain symbols between which the pilot time domain symbols are inserted. Details are as follows.

Manner 1: If the transmit end and the receive end agree on values of m and n in advance, for example, m=8, and n=1, the transmit end may add the information indicating "whether the pilot time domain symbol is inserted" to an FC field (for example, an FC field or a header field) of the physical frame. For example, one bit may be used to indicate the information. If the bit is "0", it indicates that no pilot time domain symbol is inserted, or if the bit is "1", it indicates that a pilot time domain symbol is inserted, and the receive end may obtain a pilot based on the values of m and n agreed on in advance.

Manner 2: If the transmit end and the receive end agree on the value of m in advance, the transmit end may add the information indicating "whether the pilot time domain symbol is inserted" and the value of n to an FC field (for example, an FC field or a header field) of the physical frame.

Manner 3: If the transmit end and the receive end agree on the value of n in advance, the transmit end may add the information indicating "whether the pilot time domain symbol is inserted" and the value of m to an FC field (for example, an FC field or a header field) of the physical frame.

It should be noted that the information sent by the transmit end to the receive end in Manner 1 to Manner 3 may all be carried in an FC field in the physical frame structure. Specific implementation is not limited herein. In addition, the FC field may simultaneously carry three pieces of information, whether the pilot time domain symbol is inserted, the value of m, and the value of n. Specific implementation is not limited herein.

In an optional implementation, the pilot time domain symbol is a SYNCP in a preamble. Further optionally, a guard interval length of the SYNCP is equal to a guard interval length of an OFDM time domain symbol. A guard interval of the OFDM time domain symbol may be a cyclic prefix (CP) of the OFDM time domain symbol. In this way, in specific implementation, the transmit end may reuse some resources, for example, a table of known frequency domain signals used by the transmit end to store the SYNCP can be reused such that some resources are saved.

Figure 7:
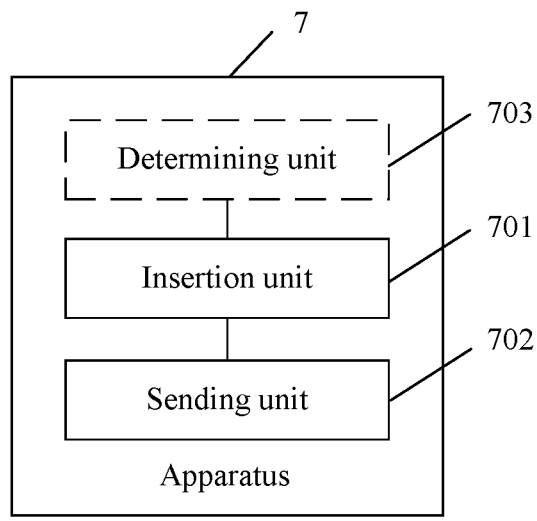
FIG. 7 is a schematic structural diagram of a signal sending apparatus according to an embodiment of the present disclosure.

As shown in FIG. 7, FIG. 7 is a schematic structural diagram of a signal sending apparatus 7 according to an embodiment of the present disclosure. The apparatus 7 shown in FIG. 7 may be the transmit end in the method shown in FIG. 2. The apparatus 7 is configured to perform the steps in the method shown in FIG. 2. The apparatus 7 is applied to a system whose physical layer frame structure includes a preamble and a PL field. The apparatus 7 includes an insertion unit 701 and a sending unit 702.

The insertion unit 701 is configured to insert one or more pilot time domain symbols between OFDM time domain symbols in the PL field to obtain a physical layer frame.

The sending unit 702 is configured to send the physical layer frame to a receive end, where the preamble and the pilot time domain symbol are used together by the receive end to perform channel estimation.

Optionally, the insertion unit 701 may be further configured to insert n pilot time domain symbols at intervals of m OFDM time domain symbols in the PL field to obtain the physical layer frame, where $m \geq 1$, $n \geq 1$, and both m and n are integers.

Optionally, the physical layer frame structure further includes an FC field, and the FC field carries at least one of the following information of whether the pilot time domain symbol is inserted in the physical layer frame, a value of m, and a value of n.

Optionally, as shown in FIG. 7, the apparatus 7 may further include a determining unit 703 configured to determine, based on a time-varying characteristic of a power line channel, at least one of the following information of whether the pilot time domain symbol is inserted in the physical layer frame, a value of m, and a value of n.

Optionally, the pilot time domain symbol is a SYNCP in the preamble. Further optionally, a guard interval length of the SYNCP is equal to a guard interval length of the OFDM time domain symbol.

For hardware implementation, the sending unit 702 may be a transmitter. In addition, the apparatus 7 may include a receiver. The receiver and the transmitter may be integrated together to form a transceiver. The insertion unit 701 and the determining unit 703 may be built in or independent of a processor in the apparatus 7 in a hardware form, or may be stored in a memory in the apparatus 7 in a software form such that the processor invokes the foregoing modules to perform corresponding operations.

Figure 8:
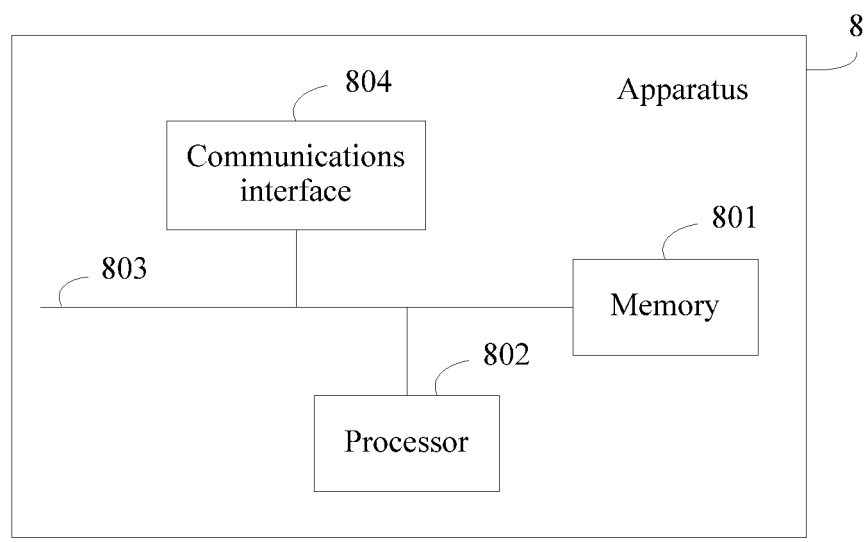
FIG. 8 is a schematic structural diagram of another signal sending apparatus according to an embodiment of the present disclosure.

As shown in FIG. 8, FIG. 8 is a schematic structural diagram of a signal sending apparatus 8 according to an embodiment of the present disclosure. The apparatus 8 shown in FIG. 8 may be the transmit end in the method shown in FIG. 2. The apparatus 8 is configured to perform the steps in the method shown in FIG. 2. The apparatus 8 includes a memory 801, a processor 802, a system bus 803, and a communications interface 804. The memory 801, the processor 802, and the communications interface 804 are coupled together using the system bus 803. The memory 801 is configured to store a program. Further, the program may include program code. The program code includes a computer operation instruction. The processor 802 is configured to execute the program stored in the memory 801 in order to implement the signal sending method shown in FIG. 2.

For example, the memory 801 in this specification may include a volatile memory, for example, a random access memory (RAM). The memory 801 may also include a non-volatile memory, for example, a read-only memory (ROM), a flash memory, a hard disk drive (HDD), or a solid state drive (SSD). The memory 801 may further include a combination of the foregoing types of memories.

The processor 802 may be a central processing unit (CPU), a general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor, or the like. Alternatively, the processor 802 may be a dedicated processor. The dedicated processor may include at least one of a baseband processing chip, a radio frequency processing chip, and the like.

The system bus 803 may include a data bus, a power bus, a control bus, a signal status bus, and the like. In this embodiment, for clear description, various buses are represented by the system bus 803 in FIG. 8.

The communications interface 804 may be a transceiver. The transceiver may be a wireless transceiver, for example, an antenna. The processor 802 receives data from or sends data to another device using the communications interface 804.

An embodiment further provides a storage medium, and the storage medium may include the memory 801.

For explanation of related content in the apparatus 8 implementation provided in this embodiment of the present disclosure, refer to the foregoing description. In addition, for the beneficial effects that can be achieved by the apparatus 7 and the apparatus 8 provided in this embodiment, refer to the beneficial effects that can be achieved using the method shown in FIG. 2. Details are not described herein again.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure.

Finally, it should be noted that the foregoing embodiments are merely intended for describing the technical solutions of the present disclosure but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A signal sending method, applied to a system with a physical layer frame structure comprising a preamble and a payload (PL) field, wherein the method comprises:
   determining a value of m and a value of n based on a time-varying characteristic of a power line channel, wherein $m \geq 1$, $n \geq 1$, and wherein both m and n are integers;
   inserting n pilot time domain symbols at intervals of m orthogonal frequency division multiplexing (OFDM) time domain symbols in the PL field to obtain a physical layer frame; and
   sending the physical layer frame to a receive end, wherein the preamble and one or more of the n pilot time domain symbol are used together for channel estimation of the receive end.

2. The method of claim 1, wherein the physical layer frame structure further comprises a frame control field, and wherein the frame control field carries information indicating whether a pilot time domain symbol is inserted in the physical layer frame.

3. The method of claim 1, wherein a pilot time domain symbol comprises a synchronization symbol (SYNCP) in the preamble.

4. The method of claim 3, wherein a guard interval length of the SYNCP is equal to a guard interval length of an OFDM time domain symbol.

5. A signal sending apparatus, applied to a system with a physical layer frame structure comprising a preamble and a payload (PL) field, the signal sending apparatus comprising:
   a memory comprising instructions; and
   one or more processors coupled to the memory, the instructions causing the one or more processors to be configured to:
   determine a value of m and a value of n based on a time-varying characteristic of a power line channel, wherein $m \geq 1$, $n \geq 1$, and both m and n are integers;
   insert n pilot time domain symbols at intervals of m orthogonal frequency division multiplexing (OFDM) time domain symbols in the PL field to obtain a physical layer frame; and
   send the physical layer frame to a receive end, wherein the preamble and one or more of the n pilot time domain symbols are used together for channel estimation of the receive end.

6. The apparatus of claim 5, wherein the physical layer frame structure further comprises a frame control field, and wherein the frame control field carries information of whether a pilot time domain symbol is inserted in the physical layer frame.

7. The apparatus of claim 5, wherein a pilot time domain symbol comprises a synchronization symbol (SYNCP) in the preamble.

8. The apparatus of claim 7, wherein a guard interval length of the SYNCP is equal to a guard interval length of an OFDM time domain symbol.

9. A non-transitory computer readable storage medium storing a program code thereon for signal sending, the program code comprising instructions for executing a method that comprises:
  determining a value of m and a value of n based on a time-varying characteristic of a power line channel, wherein m≥1, n≥1, and both m and n are integers;
  inserting n pilot time domain symbols at intervals of m orthogonal frequency division multiplexing (OFDM) time domain symbols in a payload (PL) field to obtain a physical layer frame, the method applied to a system with a physical layer frame structure comprising a preamble and the PL field; and
  sending the physical layer frame to a receive end, wherein the preamble and one or more of the n pilot time domain symbols are used together for channel estimation of the receive end.

10. The non-transitory computer readable storage medium of claim 9, wherein the physical layer frame structure further comprises a frame control field, and wherein the frame control field caries information of whether a pilot time domain symbol is inserted in the physical layer frame.

11. The non-transitory computer readable storage medium of claim 9, wherein a pilot time domain symbol comprises a synchronization symbol (SYNCP) in the preamble.

12. The non-transitory computer readable storage medium of claim 11, wherein a guard interval length of the SYNCP is equal to a guard interval length of an OFDM time domain symbol.

* * * * *